T. BEALE.
Cultivator.
No. 58,578. Patented Oct. 9, 1866.
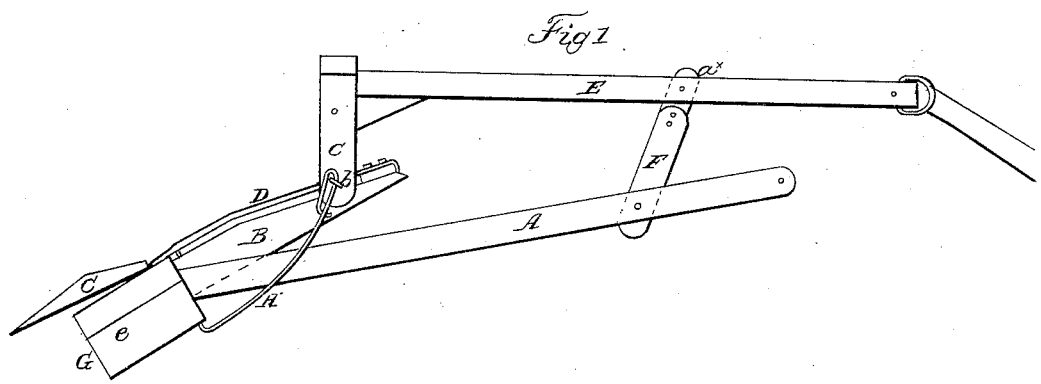
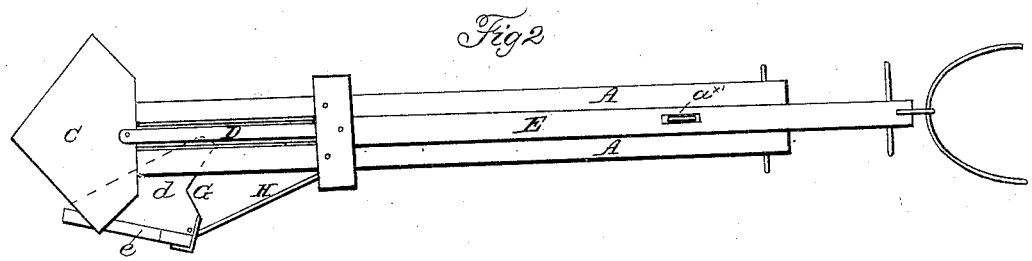
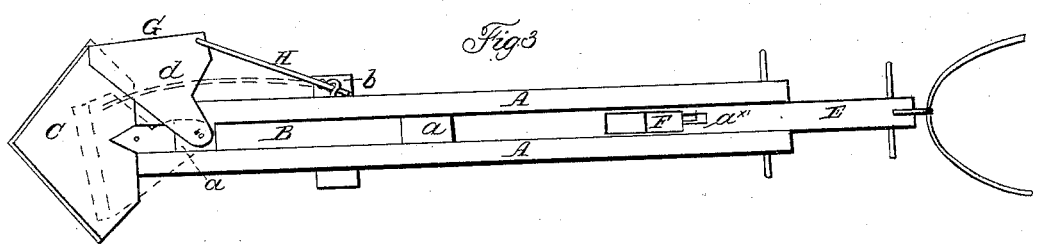

UNITED STATES PATENT OFFICE.

THOMAS BEALE, OF NEW MILFORD, ILLINOIS.

IMPROVEMENT IN CULTIVATORS.

Specification forming part of Letters Patent No. 58,578, dated October 9, 1866.

*To all whom it may concern:*

Be it known that I, THOMAS BEALE, of New Milford, in the county of Winnebago and State of Illinois, have invented a new and Improved Implement for Weeding and Hilling Plants; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, a plan or top view of the same; Fig. 3, an inverted plan of the same.

Similar letters of reference indicate like parts.

This invention relates to a new and useful implement or device for weeding and hilling plants, and is designed to supersede the hoe and other hand implements hitherto used for such purposes by rendering the labor lighter, a person being enabled to use my improvement without stooping.

A A represent two bars, which are connected by cross-pieces $a$ $a$, and having a bar, B, pivoted between them at one end, to which bar a V-shaped spade or shovel, C, is attached.

To the upper surface of the bar B there is secured a metal guide-bar, D, underneath which a rod, $b$, passes, said rod being attached to the lower ends of pendants $c$ $c$, which are secured to the front end of a bar, E, the latter being connected by a link, $a^*$, to the upper end of a bar, F, the lower end of which is secured by a pivot between the bars A A, to which the spade or shovel is attached.

It will be seen from the above description that, by moving the bar E forward and backward, the bar B, to which the spade or shovel is attached, will be moved on its pivot, and the spade or shovel raised and lowered, said result being attained by the action of the rod $b$ on bar B and the guide-bar D.

G represents a scraper and hilling device, composed of a metal plate, $d$, which is pivoted to the under side of cross-piece $a$ at the front ends of the bars A A, the outer edge of the plate $d$ having an upright flange, $e$, attached to it to gather and throw the earth toward the hills or plants. This scraper and hilling device is operated from one of the pendants $c$ by a rod, H, the scraper and hiller being moved or thrown underneath the spade or shovel C each time the bar E is shoved forward.

By means of this implement plants may be hoed, weeded, and hilled with the greatest facility, and without the necessity of the operator stooping, as is necessary with the ordinary hoe and other weeding implements. The bar E may have its outer end provided with a strap to pass around the neck and rest upon the shoulders of the operator, and both the bar E and bars A A may be moved or worked by the hands.

Having thus described my invention, I claim as new and desire to secure by Letters Patent—

The bars A A, having the bar B pivoted to them, with the spade or shovel C attached to the front end of the latter, in combination with the bar E, connected to the bar F, which is pivoted to A A, and connected to the pivoted bar B through the medium of the rod $b$ and guide-bar D, and the scraper and hilling device G, pivoted to the front ends of the bars A A, and operated from one of the pendants $c$ by the rod H, substantially as and for the purpose set forth.

The above specification of my invention signed by me this 14th day of April, 1866.

THOMAS BEALE.

Witnesses:
  H. N. STURR,
  S. RISING.